US012118578B2

(12) United States Patent
Qu et al.

(10) Patent No.: US 12,118,578 B2
(45) Date of Patent: Oct. 15, 2024

(54) METHOD AND APPARATUS FOR PROCESSING COMMODITY INFORMATION, DEVICE AND STORAGE MEDIUM

(71) Applicant: BEIJING BAIDU NETCOM SCIENCE TECHNOLOGY CO., LTD., Beijing (CN)

(72) Inventors: Jing Qu, Beijing (CN); Mengbo Liu, Beijing (CN); Zhi Feng, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 111 days.

(21) Appl. No.: 17/822,507

(22) Filed: Aug. 26, 2022

(65) Prior Publication Data
US 2022/0405792 A1   Dec. 22, 2022

(30) Foreign Application Priority Data
Aug. 30, 2021   (CN) .......................... 202111008486.X

(51) Int. Cl.
G06F 16/245    (2019.01)
G06F 16/901    (2019.01)
G06Q 30/0207   (2023.01)

(52) U.S. Cl.
CPC ....... *G06Q 30/0207* (2013.01); *G06F 16/245* (2019.01); *G06F 16/9027* (2019.01)

(58) Field of Classification Search
CPC ............. G06F 16/2228; G06F 16/2246; G06F 16/245; G06F 16/2455; G06F 16/9027;
(Continued)

(56) References Cited

U.S. PATENT DOCUMENTS 10,445,361 B2 * 10/2019 Kreutzer ............... G06F 16/532
2012/0226560 A1 * 9/2012 Chang .................... G06Q 30/02
705/14.66
(Continued)

FOREIGN PATENT DOCUMENTS

CN   109741087 A   5/2019
CN   111028000 A   4/2020
(Continued)

OTHER PUBLICATIONS

Office Action issued in Chinese Application No. 202111008486.X, mailed on Aug. 29, 2023 (20 pages).
(Continued)

*Primary Examiner* — James E Richardson
(74) *Attorney, Agent, or Firm* — Osha Bergman Watanabe & Burton LLP

(57) ABSTRACT

A method for processing commodity information includes: obtaining commodity information of a commodity, in which the commodity information includes a target commodity configuration and a configuration value; obtaining a composite structure of matching conditions associated with the commodity, in which the composite structure is a tree structure of matching conditions with respect to commodity configurations, non-leaf nodes of the tree structure are in an AND-OR relationship, leaf nodes of the tree structure store Boolean expressions, each Boolean expression includes a commodity configuration, a matching value and a matching operator; obtaining a target expression having an AND-OR relationship by traversing the matching conditions in the composite structure; and obtaining a matching result by performing a matching process based on the target expression, the target commodity configuration and the configuration value of the commodity.

17 Claims, 8 Drawing Sheets

(58) Field of Classification Search
CPC ........... G06Q 30/0207; G06Q 30/0605; G06Q 20/065
See application file for complete search history.

(56) References Cited

U.S. PATENT DOCUMENTS

| | | | |
|---|---|---|---|
| 2012/0226697 A1* | 9/2012 | Chang | G06Q 30/0204 707/E17.089 |
| 2017/0147621 A1* | 5/2017 | De Smet | G06F 16/2246 |
| 2017/0236143 A1* | 8/2017 | Code | G06Q 20/387 705/14.27 |

FOREIGN PATENT DOCUMENTS

| | | | | |
|---|---|---|---|---|
| CN | 111340542 A | | 6/2020 | |
| EP | 2927861 A1 | * | 10/2015 | ....... G05B 19/41805 |
| JP | 2002032631 A | * | 1/2002 | |

OTHER PUBLICATIONS

Ayu; "Jingdong a week to buy machine discount summary Apple to high cut 1900 yuan the highest;" Zhongguancun Online Original; Jun. 6, 2020; (2 pages).

* cited by examiner

METHOD AND APPARATUS FOR PROCESSING COMMODITY INFORMATION, DEVICE AND STORAGE MEDIUM

CROSS REFERENCE TO RELATED APPLICATIONS

This application claims priority and benefits to Chinese Application No. 202111008486.X, filed on Aug. 30, 2021, the entire content of which is incorporated herein by reference.

TECHNICAL FIELD

The disclosure relates to a field of computer technology, especially a field of information processing technology, and in particular to a method for processing commodity information, an apparatus for processing commodity information, an electronic device and a computer-readable storage medium.

BACKGROUND

With the popularization of electronic shopping and online shopping malls, the use of electronic vouchers (E-vouchers) has become a relatively common promotion means.

SUMMARY

In one aspect, a method for processing commodity information includes: obtaining commodity information of a commodity, in which the commodity information includes a target commodity configuration and a configuration value; obtaining a composite structure of matching conditions associated with the commodity, in which the composite structure is a tree structure of matching conditions with respect to commodity configurations, non-leaf nodes of the tree structure are in an AND-OR relationship, leaf nodes of the tree structure store Boolean expressions, each Boolean expression includes a commodity configuration, a matching value and a matching operator; obtaining a target expression having an AND-OR relationship by traversing the matching conditions in the composite structure; and obtaining a matching result by performing a matching process based on the target expression, the target commodity configuration and the configuration value of the commodity.

In another aspect, an electronic device includes: at least one processor and a memory communicatively coupled to the at least one processor. The memory stores instructions executable by the at least one processor, and when the instructions are executed by the at least one processor, the method for processing commodity information as described above is implemented.

In yet another aspect, a non-transitory computer-readable storage medium has computer instructions stored thereon. The computer instructions are configured to cause a computer to implement the method for processing commodity information as described above.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

In the related art, the application scene of E-vouchers supported by the existing E-voucher issuance system is relatively limited. For example, the E-vouchers are only used for specific products, specific regions, specific payment modes (e.g., prepaid, postpaid, or both prepaid and postpaid) and cases when reaching a total order amount limit or reaching a total product amount limit. The scenes of issuing or using E-vouchers for specific configurations of commodities or specific types of order are not supported.

The applicant found that this limitation is caused by the fact that each group of matching conditions for realizing the issuance and use of the E-vouchers is formulated respectively for an individual configuration of the commodity (such as the commodity type, the region, the payment mode or the amount) and the groups of matching conditions are independent and are separated from each other.

In order to solve the above problems, the disclosure provides a method for processing commodity information, an apparatus for processing commodity information, an electronic device and a storage medium.

Figure 1:
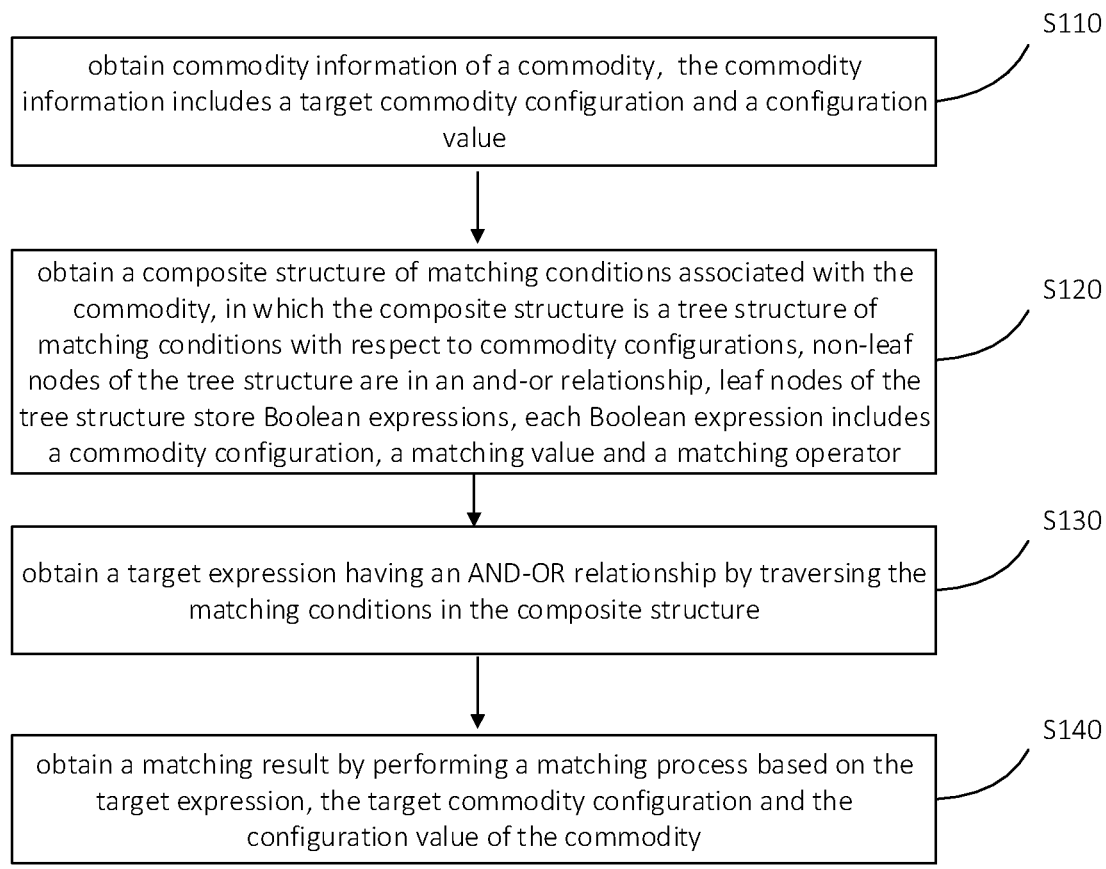
FIG. 1 is a flowchart illustrating a method for processing commodity information according to embodiments of the disclosure.

FIG. 1 is a flowchart illustrating a method for processing commodity information according to embodiments of the disclosure. As illustrated in FIG. 1, the method includes the following.

In S110, commodity information of a commodity to be matched is obtained. The commodity information includes a target commodity configuration and a configuration value.

In S120, a composite structure of matching conditions associated with the commodity is obtained. The composite structure is a tree structure of matching conditions with respect to commodity configurations, non-leaf nodes of the tree structure are in an AND-OR relationship, leaf nodes of the tree structure store Boolean expressions, and each Boolean expressions includes a commodity configuration, a matching value and a matching operator.

In S130, a target expression having an AND-OR relationship is obtained by traversing the matching conditions in the composite structure.

In S140, a matching result is obtained by performing a matching process based on the target expression, the target commodity configuration and the configuration value of the commodity.

The disclosure provides a method for processing commodity information, an apparatus for processing commodity information, an electronic device and a storage medium. The method uses the tree structure of matching conditions with respect to the commodity configurations as a representation structure of the matching conditions, and performs the matching operation on the commodity information. The non-leaf nodes of the tree structure are in an AND-OR relationship, and the leaf nodes of the tree structure store Boolean expressions including the commodity configurations, the matching values and the matching operators. In this way, the target expression having the AND-OR relationship is obtained by traversing the tree structure, and it is determined whether the commodity satisfies the matching conditions by performing the matching processing based on the corresponding configuration value of the commodity and the target expression having the AND-OR relationship, and subsequent processing can be performed in response to determining that the matching conditions are satisfied.

By using the tree structure corresponding to the commodity configurations as the representation structure of the matching conditions, fine-granularity matching conditions can be formulated for each commodity configuration. In addition, since the tree structure is easy to stretch, the matching conditions can be flexibly increased or decreased according to business needs. Moreover, by setting the AND-OR relationship between the non-leaf nodes, a logical operation can be performed on the Boolean expressions stored in the leaf nodes, so that more accurate matching conditions are generated through combination.

In the step S110, the commodity generally refers to an item that can be traded, sold or exchanged through an online trading system, which can be virtual or physical, tangible or intangible.

The target commodity configuration is the commodity configuration of the commodity, and the commodity configuration is used to reflect the function, performance, or energy consumption of the commodity, such as brand name, commodity model, commodity size, commodity energy consumption, and models of key components.

For example, assuming that the commodity for sale is mobile phone of the model 2 of brand A, the target configuration information of the mobile phone is provided as follows:

Memory size: 8 GB+128 GB|12 GB+256 GB;
RAM standard: LPDDR4x;
ROM standard: UFS3.1;
Size: 6.55 inches;
Screen-to-body ratio: 80%;
Resolution: 2400×1080;
Brightness: global default maximum brightness: 400 nit; global maximum excitation brightness: 600 nit; local maximum peak brightness: 1000 nit;
Sensor standard: 16M 1/3.09", 1.0 µm, 4:3;
Camera standard: f/2.2, 4P lens, fixed focus;
Shooting modes: photo, night scene, panorama, portrait, time-lapse photography, video.

In the step S120, the matching conditions associated with the commodity refer to matching conditions formulated for the commodity or applicable to the commodity. The matching conditions are used to determine whether the commodity satisfies specific requirements. For example, the matching conditions are used to determine whether the commodity is suitable for a certain E-voucher. The matching conditions used in the disclosure are mainly with respect to the commodity configurations, such as "memory size>=8G".

Generally, the matching conditions are related to specific usage scenes, such as voucher issuance process, order matching process, payment verification process, API payment process, available voucher screening process, user console display, service provider console display and data statistical analysis. The matching conditions applicable to each scene are also different.

The matching conditions are often pre-defined, stored in data storage systems such as databases, LDAP servers and file systems, and marked with commodities or scenarios to which the matching conditions are applicable.

The composite structure of matching conditions associated with the commodity is a data structure that combines at least one matching condition associated with the commodity in a specific manner.

In the case that the matching conditions associated with the commodity are stored in the data storage system one by one, all matching conditions associated with the commodity under the current scene can be selected, such that the composite structure is generated based on the found matching conditions. In the case that the matching conditions associated with the commodity are created as a group of matching conditions at one shot and are stored in accordance with a data structure that is the same as the composite structure, the composite structure of matching conditions associated with the commodity under the current scene can be obtained directly from the data storage system.

In embodiments of the disclosure, the composite structure is a tree structure. The non-leaf nodes of the tree structure are in a logical relationship, such as an AND-OR relationship. In particularly, the non-leaf nodes are either in the AND relationship or in the OR relationship. The AND-OR relationship indicates the logical relationship between child nodes of the node. The AND relationship refers to that the result is True if all operands are True. The OR relationship refers to that the result is False if all operands are False.

Figure 2:
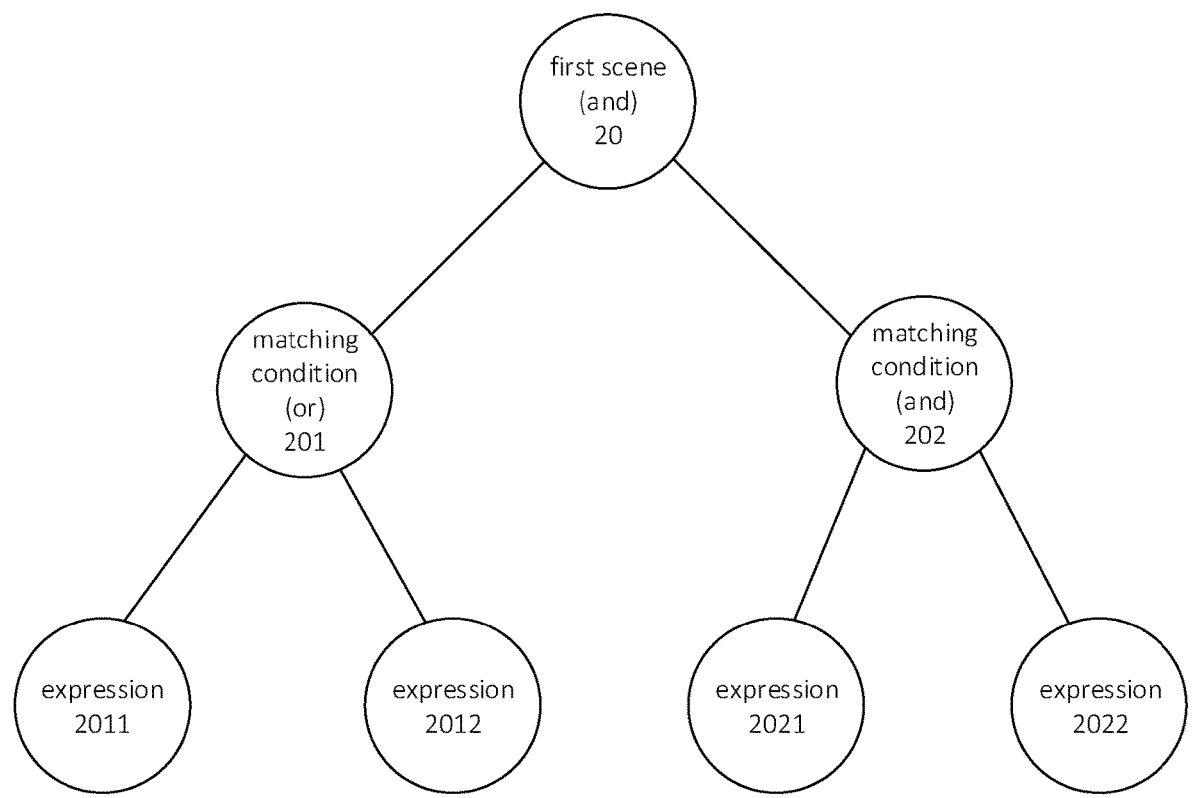
FIG. 2 is a schematic diagram illustrating a composite structure in the method for processing commodity information according to embodiments of the disclosure.

FIG. 2 illustrates a composite structure of matching conditions according to embodiments of the disclosure. The root node of the composite structure is first scene 20, indicating that the composite structure is suitable for the first scene. The AND-OR relationship provided by this node is AND, indicating that the logical relationship between its sub-bytes, for example, the matching condition 201 and the matching condition 202, is AND. The matching condition 201 is one of the matching conditions in the composite structure, and the AND-OR relationship provided by itself is OR, indicating that the logical relationship between its sub-bytes, for example, the expression 2011 and the expression 2012, is OR. The matching condition 202 is another one of the matching conditions in the composite structure, and the AND-OR relationship provided by itself is AND, indicating that the logical relationship between its sub-bytes, for example, the expression 2021 and the expression 2022, is AND. Expressions 2011, 2012, 2021 and 2022 are leaf nodes. In the disclosure, Boolean expressions are stored in the leaf nodes. Each Boolean expression generally includes a commodity configuration, a matching value and a matching operator. The matching value is a value that is to be compared with the configuration value. The matching operator is a matching operation to be performed, which can be for example "greater than", "equal to", or "contain (or include, or variants thereof)". As an example, the expression is "shooting mode contains video", where the commodity configuration is "shooting mode", the matching value is "video", and the matching operator is "contains". The return value of the expression is a Boolean value, which is either True or False.

In the step S140, obtaining the target expression having the AND-OR relationship by traversing the matching conditions of the composite structure mainly includes: traversing the tree structure of the composite structure; recording the AND-OR relationships of the non-leaf nodes, a nested relationship between the AND-OR relationships, and the expressions stored in the leaf nodes during the traversal process; and obtaining the target expression having the AND-OR relationship.

For example, a path obtained by the preorder traversal of the composite structure illustrated as FIG. 2 includes: AND, OR, expression 2011, expression 2012, AND, expression 2021, expression 2022. The expressions of the leaf nodes and the logical operators of the non-leaf nodes are combined according to a parent-child relationship, to obtain the following target expression having the AND-OR relationship: ((expression 2021 OR expression 2022) AND (expression 2021 AND expression 2022)).

Afterwards, the value of each expression is calculated according to the target commodity configuration and configuration value of the commodity, and a Boolean matching result is obtained by performing the logical AND-OR operations. If the value of the Boolean matching result is True, it means that the commodity satisfies the matching conditions. If the value of Boolean matching result is False, it means that the commodity does not satisfy the matching conditions.

Since the matching conditions are set with respect to the commodity configurations, fine-granularity matching can be performed for each commodity configuration of the commodity, and different processing can be taken according to the different commodity configurations.

For example, specific E-vouchers can be issued for mobile phones with the memory less than 128G.

In addition, since non-leaf nodes can specify relationship certain AND-OR relationship, the expressions of at least one leaf node can be combined, to achieve more precise matching.

For example, more precise matching can be achieved by combining the expression "memory less than 128G" and the expression "size less than 6 inches" using the AND relationship. In this way, specific E-vouchers can be issued for mobile phones with the memory less than 128G and the size less than 6 inches for more precise marketing.

In addition, the tree structure of the composite structure is easy to scale, such that addition matching conditions can be added to the composite structure and existing matching conditions can be deleted from the composite structure. That is, the matching conditions can be changed flexibly according to business needs.

It is to be noted that the embodiments of FIG. 1 are basic embodiments of the method for processing commodity information of the disclosure, and the method may be further refined and expanded on the basis thereof.

Figure 3:
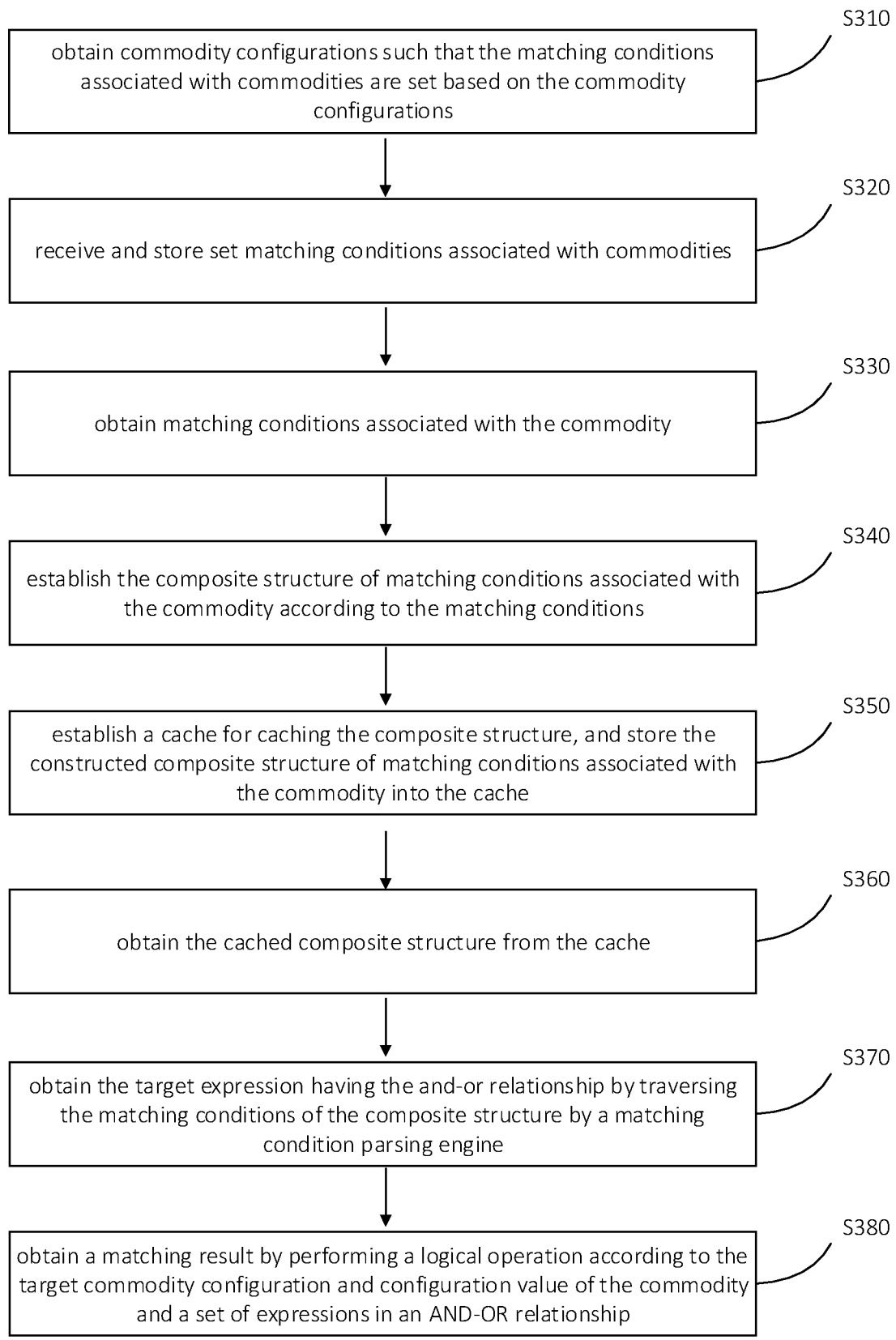
FIG. 3 is a flowchart illustrating a method for processing commodity information according to embodiments of the disclosure.

FIG. 3 is a flowchart illustrating a method for processing commodity information according to embodiment of the disclosure.

In embodiments, the matching conditions are mainly used to determine whether the commodity for sale satisfies the conditions of using the E-vouchers. The matching process mainly includes the following, where a process of establishing the composite structure and a process of performing the matching process between the target commodity configuration and the configuration value of the commodity to be matched with the composite structure are included.

In S310, the commodity configurations are obtained such that matching conditions associated with a commodities are set by a user based on the commodity configurations.

In embodiments, a group of matching conditions can be defined for each application scene of each commodity through an interactive interface.

In order to facilitate business personnel to set the matching conditions, the commodity configuration(s) of a current commodity and a value range of each commodity configuration can be displayed on this interactive interface. In this embodiment, these information is stored in a configuration item-value relationship table. The configuration item-value relationship table includes the commodity name, the configuration item name, the configuration item value, the configuration item value description and other fields. Moreover, these information can be also stored in a voucher configuration level—item relationship table. The voucher configuration level-item relationship table includes: the commodity name, the configuration item name, the configuration item description, the configuration item type, and the configuration item unit.

Based on these information, business personnel can easily customize the matching conditions associated with the commodity.

In S320, the matching conditions associated with the commodities set by the user are received and stored.

These matching conditions are stored in a table of the database. The table includes the applicable scenes, the matching condition names, the matching condition descriptions, and the commodity names.

Since the matching conditions associated with the commodity can be customized, program codes for implementing this function can be applied to more commodities and more application scenes, which greatly improves the universality of the application program.

In S330, the matching conditions associated with the commodity are obtained.

In embodiments, the matching conditions associated with a current commodity and applicable to the current usage scene are found from the table of the database based on the commodity name of the current commodity. These matching conditions can be used in dynamically establishing the composite structure of matching conditions associated with the commodity.

Since the data structure of the matching condition is simpler than the tree structure, the matching condition is easy to search and locate and is convenient to store. In addition, this embodiment can dynamically generate the composite structure, which is especially suitable for scenes where the matching conditions change frequently.

In S340, the composite structure of matching conditions associated with the commodity is established according to the matching conditions.

Figure 4:
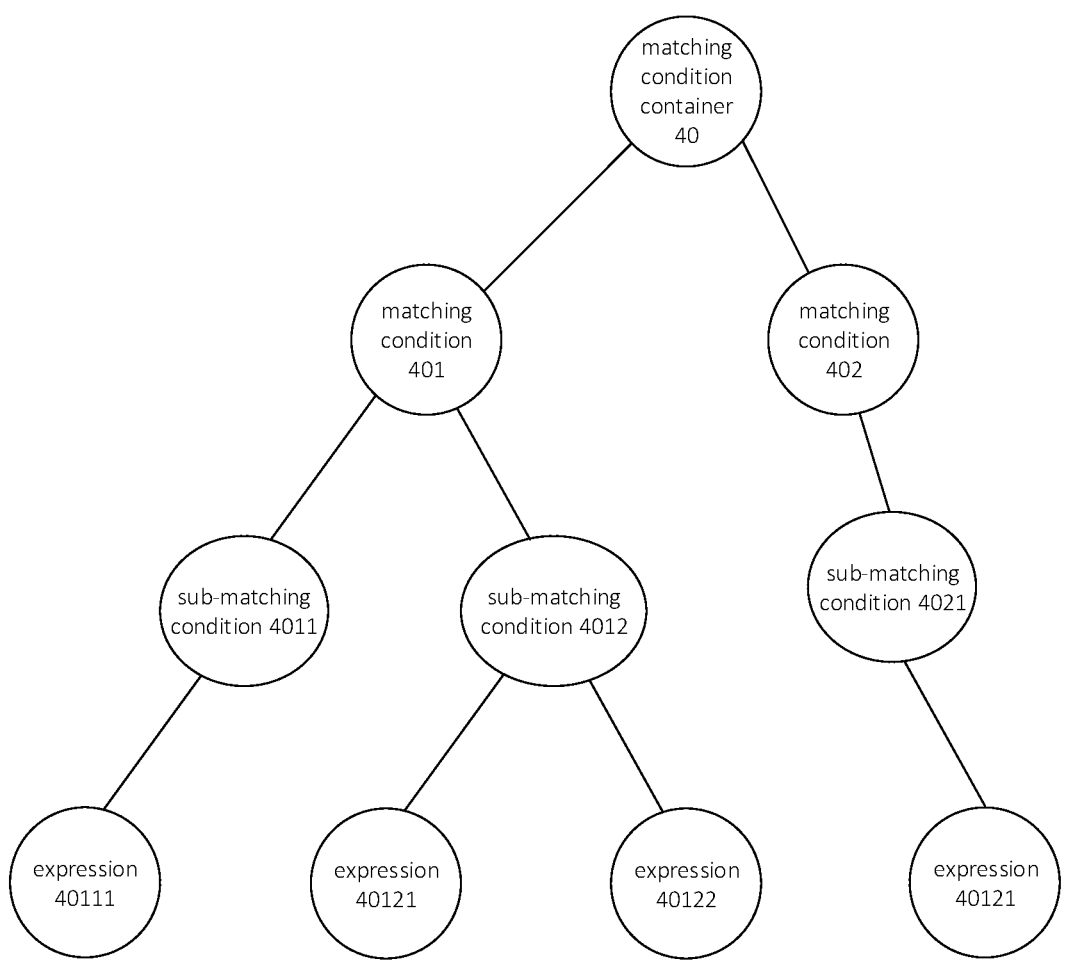
FIG. 4 is a schematic diagram illustrating a composite structure in a method for processing commodity information according to embodiments of the disclosure.

FIG. 4 illustrates the composite structure adopted in embodiments. The number of levels (layers) of this composite structure is fixed, totally 4 levels. The AND-OR relationship of each non-leaf node is related to a depth of the non-leaf node. The depth of a node refers to the number of nodes including the root node that pass from the root node to the node in turn, and can also be considered as the number of levels of the hierarchical structure of the tree. For example, the first level nodes (the child nodes of the root node) of the tree structure are in the AND relationship, the second level nodes (the child nodes of the first level node) are in the OR relationship, and the third level nodes (the child nodes of the second level node) are in the AND relationship.

If the AND-OR relationship is determined according to the number of levels, it is not necessary to specify the AND-OR relationship for each non-leaf node, which is simpler to parse and beneficial to improve the work efficiency of the matching condition parsing engine. According to the experience of practical application, the 4-level tree structure can satisfy the complexity requirements of most matching conditions with respect to commodity configuration. In this way, the problems of insufficient computing resources or excessive response time due to too many levels of the tree structure can be avoided, thereby greatly reducing computing resources and shortening processing time in real-time processing.

In detail, in the composite structure illustrated as FIG. 4, the root node represents a matching condition container 40 suitable for a certain scene. The matching condition container 40 includes at least one matching condition (for example, the matching condition container 40 includes the matching condition 401 and the matching condition 402), each matching condition is set with respect to one commodity configuration of the commodity. The relationship between the matching conditions is AND. Each matching condition (for example, the matching condition 401) includes at least one sub-matching condition (for example, the matching condition 401 includes the sub-matching condition 4011 and the sub-matching condition 4012). Each sub-matching condition is a range of the configuration value with respect to the commodity configuration. The relationship between the sub-matching conditions is OR. Each sub-matching condition (e.g., the sub-matching condition 4012) includes at least one expression (typical value). The relationship between the expressions is AND.

Assuming that the condition designed for the E-vouchers by the business personnel is: one CPU core or above; memory greater than 2G and less than 4G; model being ordinary type I or ordinary type II.

According to the preset AND-OR relationship, the AND-OR relationship between the above matching conditions is AND. The above matching conditions can be decomposed to further determine the sub-matching conditions and the expressions.

For example, "memory greater than 2G and less than 4G" can be decomposed to obtain two expressions, i.e., "memory greater than 2G" and "memory less than 4G". The relationship between these two expressions is AND. These two expressions can be two leaf nodes of a sub-matching node.

Figure 5:
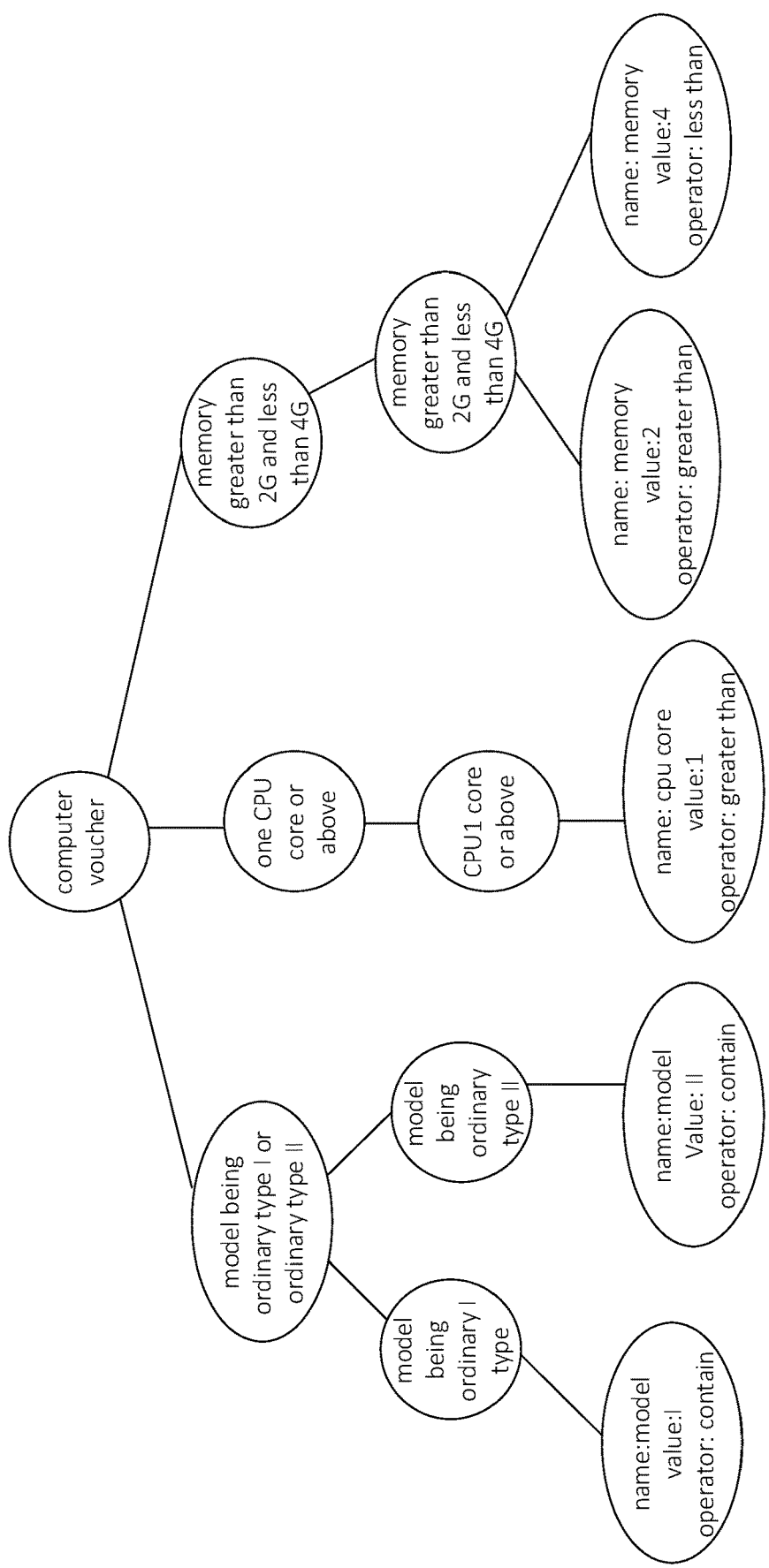
FIG. 5 illustrates an example of the composite structure in the method for processing commodity information according to embodiments of the disclosure.

For example, "the model being ordinary I type or ordinary II" can be decomposed to obtain two expressions, i.e., "the model being ordinary I" and "the model being ordinary II", and the relationship between these two expressions is OR. These two expressions can be two leaf nodes of a sub-matching condition node. In this way, the composite structure illustrated as FIG. 5 can be constructed.

In S350, a cache for caching the composite structure is established, and the constructed composite structure of matching conditions associated with the commodity is saved into the cache.

Generally, the magnitude of caching the composite structure is small and there barely has changes, which is widely applied in various scenes and used frequently. Therefore, in embodiments of the disclosure, a cache is specially established for caching the composite structure. Therefore, the composite structure can be obtained directly from the cache, which greatly improves query efficiency, reduces database access pressure, and improves service response performance.

In addition, in order to prevent the cached data from expiring, an automatic refresh mechanism is also established in embodiments of the disclosure, to regularly update the composite structure in the cache.

In S360, the cached composite structure is obtained from the cache.

In S370, a target expression having an AND-OR relationship is obtained by a matching condition parsing engine by traversing the matching conditions in the composite structure by a matching condition parsing engine.

In embodiments of the disclosure, the matching condition parsing engine used for the composite structure illustrated as FIG. 4 performs the matching between the target commodity information and the composite structure.

The matching condition parsing engine can utilize a graph operation method of the tree structure, and use the same processing logic to carry out unified processing on the composite structure as illustrated in FIG. 4, to obtain the output matching result of the target expression having the AND-OR relationship.

The specific operation performed by the matching condition parsing engine is similar to the operation of the foregoing operation in S140, which refers to the description of S140, which will not be repeated here.

In S380, a matching process is performed to obtain a matching result according to the target commodity configuration and configuration value of the commodity and the target expression having the AND-OR relationship.

In embodiments of the disclosure, the above operations are also completed by the matching condition parsing engine. Taking FIG. 5 as an example, the operations mainly includes the following. The expression of each sub-matching condition is traversed. The configuration value of the commodity configuration (i.e. the "name" in FIG. 5) in the expression is obtained, and a matching operation corresponding to a matching operator (i.e. the "operator" in FIG. 5) is performed on a matching value (i.e., "the value" in FIG. 5) and the configuration value. If the result of the matching operation is True, it means that this expression is true, the AND operation is performed on the result of each expression under the sub-matching condition to obtain the matching result of the sub-matching condition; the OR operation is performed on the matching result of each sub-matching condition under the matching condition to obtain the matching result of the matching condition; and the AND operation is performed to the matching result of each matching condition to obtain the matching result of the composite structure.

Through the matching condition parsing engine, the matching conditions with respect to the commodity configurations can be separated from the program processing. That is, it is possible to process the composite structure with different node numbers and different node values using only the same operation applicable to the tree structure. In this way, it is possible to easily cope with various changes in marketing strategies and adapt to various scenes without increasing research and development costs.

Figure 6:
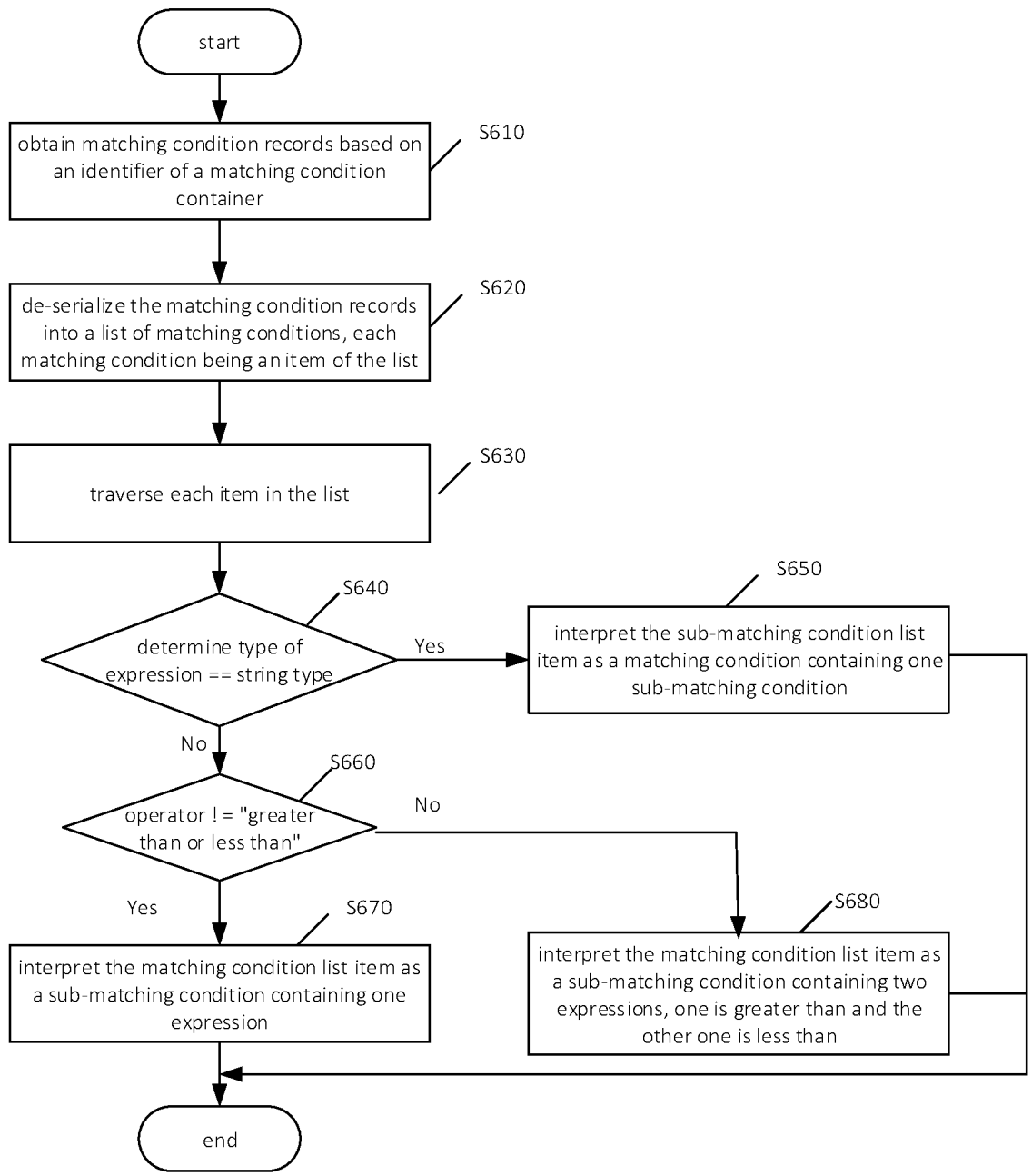
FIG. 6 illustrates a process of constructing a composite structure in the method for processing commodity information according to the disclosure.

FIG. 6 illustrates a flowchart of constructing a composite structure according to the stored matching conditions, and its main process includes the following.

In S610, matching condition records are obtained according to an identifier of a matching condition container.

In S620, the matching condition records are de-serialized into a matching condition list. Each matching condition is an item of the matching condition list, referred as a matching condition list item.

In S630, each matching condition list item is traversed.

Each match condition record has an expression type, such as a string type and a numeric type.

In S640, it is determined whether the type of an expression is the string type, if the type of the expression is the string type, step S650 is executed, if the type of the expression is not the string type, step S660 is executed.

In S650, the matching condition list item is interpreted as a matching condition containing one sub-matching condition.

In S660, it is determined whether the operator is "greater than or less than". If the operator is the "greater than or less than", S670 is executed. If the operator is not the "greater than or less than", S680 is executed.

In embodiments of the disclosure, the operator can be "greater than", "less than", "contain (or include or variants thereof)" and "equal to".

In S670, this matching condition list item is interpreted as a sub-matching condition containing one expression.

In S680, this matching condition list item is interpreted as a sub-matching condition containing two expressions, one is "greater than" and the other one is "less than".

Figure 7:
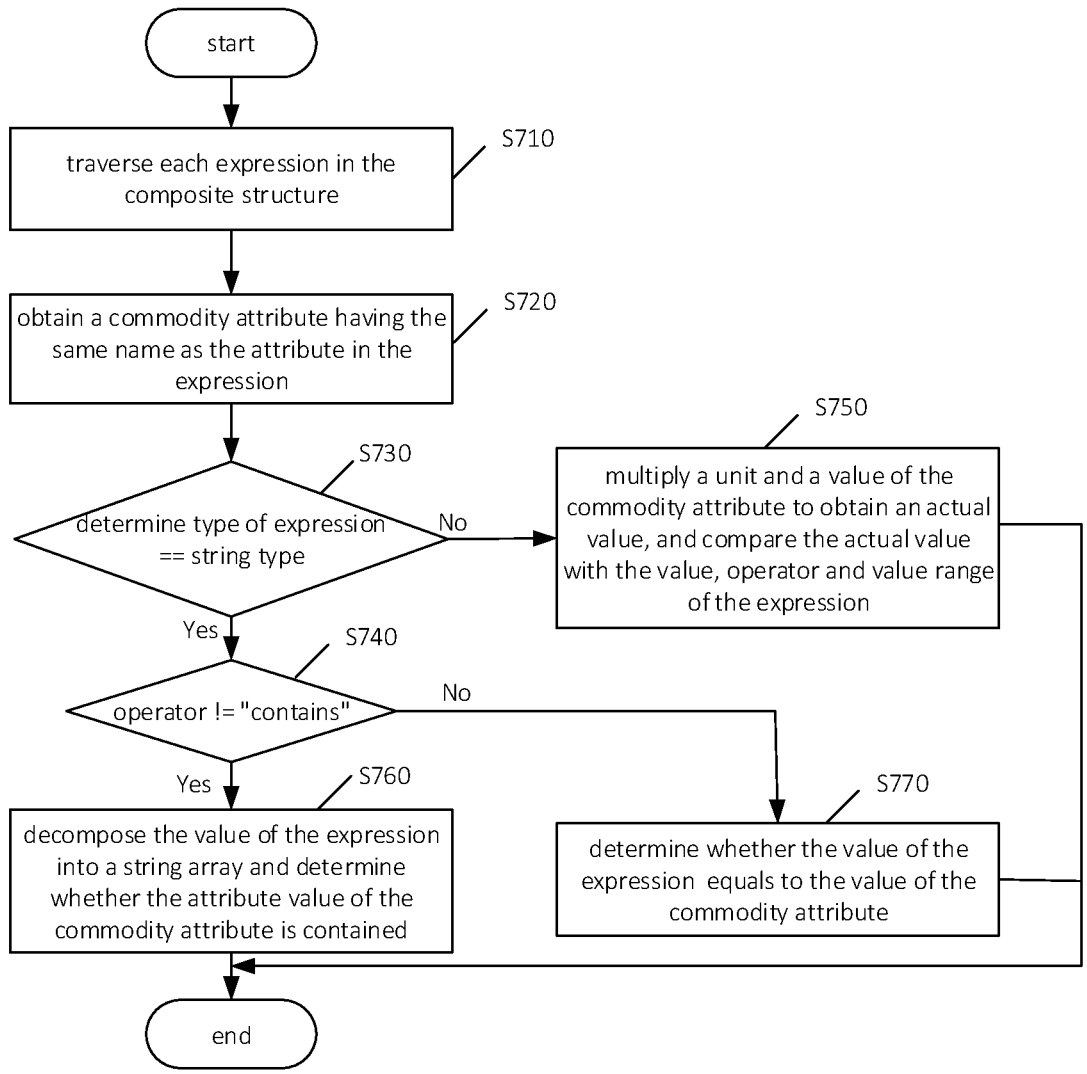
FIG. 7 illustrates a flowchart of performing matching processing based on the composite structure constructed in FIG. 6 according to the method for processing commodity information of the disclosure.

FIG. 7 illustrates a flowchart of matching processing according to the composite structure constructed in FIG. 6, and its main process includes the following.

In S710, each expression in the composite structure is traversed.

In S720, a commodity attribute having the same name as the attribute in the expression is determined from commodity attributes.

In S730, it is determined whether the type of the expression is a string type. If the type of the expression is the string type, S740 is executed. If the type of the expression is not the string type, S750 is executed.

In S740, it is determined whether the operator is "contain". If it is determined that the operator is "contain", S760 is executed. If it is determined that the operator is not "contain", S770 is executed.

In S750, the unit and value of the commodity attribute are multiplied to obtain an actual value, and the actual value is compared with the value of the expression, the operator and the value range.

In S760, the value of the expression is decomposed into a string array, and it is determined whether the attribute value of the commodity attribute is contained.

In S770, it is determined whether the value of the expression equals to the value of the commodity attribute by comparison.

Figure 8:
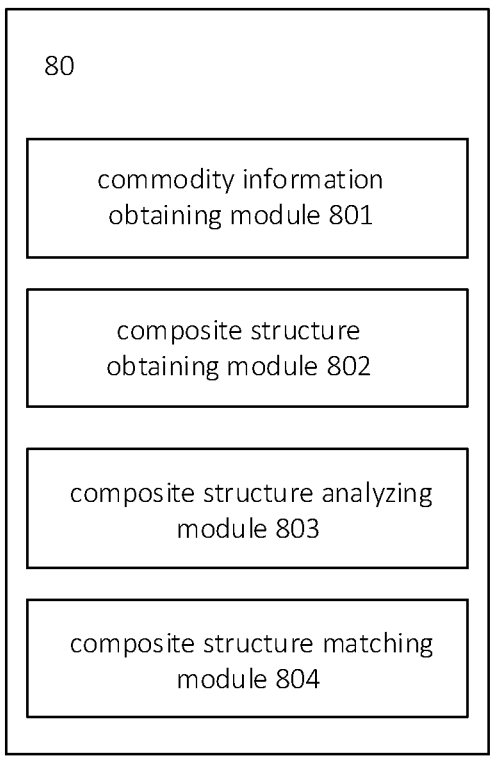
FIG. 8 is a schematic diagram illustrating an apparatus for processing commodity information according to the disclosure.

According to embodiments of the disclosure, there is provided an apparatus for processing commodity information. As illustrated in FIG. 8, the apparatus 80 includes: a commodity information obtaining module 801, a composite structure obtaining module 802, a composite structure analyzing module 803 and a composite structure matching module 804.

The commodity information obtaining module 801 is configured to obtain commodity information of a commodity. The commodity information includes a target commodity configuration and a configuration value.

The composite structure obtaining module 802 is configured to obtain a composite structure of matching conditions associated with the commodity. The composite structure is a tree structure of the matching conditions with respect to commodity configurations, non-leaf nodes of the tree structure are in an AND-OR relationship, leaf nodes of the tree structure store Boolean expressions, and each Boolean expression includes a commodity configuration, a matching value and a matching operator.

The composite structure analyzing module 803 is configured to obtain a target expression having an AND-OR relationship by traversing the matching conditions in the composite structure.

The composite structure matching module 804 is configured to obtain a matching result by performing a matching process based on the target expression, the commodity configuration and the configuration value of the commodity.

According to some embodiments of the disclosure, the apparatus 80 further includes: a cache establishing module, configured to establish a cache for caching the composite structure.

According to some embodiments of the disclosure, the composite structure obtaining module 802 includes: a matching condition obtaining sub-module and a composite structure establishing sub-module. The matching condition obtaining sub-module is configured to obtain matching conditions associated with the commodities. The composite structure establishing sub-module is configured to establish the composite structure of matching conditions associated with the commodity according to the matching conditions.

According to some embodiments of the disclosure, the apparatus 80 further includes: a commodity configuration obtaining module and a matching condition setting module. The commodity configuration obtaining module is configured to obtain commodity configurations such that the user sets the matching conditions associated with commodities based on the commodity configurations. The matching condition setting module is configured to receive and store the matching conditions associated with the commodities set by the user.

According to some embodiments of the disclosure, the composite structure analyzing module 803 is further configured to: obtain the target expression having the AND-OR relationship by traversing the matching conditions of the composite structure by a matching condition parsing engine.

In the technical solution of the disclosure, the acquisition, storage and application of the involved user personal information all comply with the provisions of relevant laws and regulations, and do not violate public order and good customs.

According to embodiments of the disclosure, there is provided an electronic device. The electronic device includes: at least one processor and a memory communicatively coupled to the at least one processor. The memory stores instructions executable by the at least one processor, when the instructions are executed by the at least one processor, the at least one processor is enabled to implement the method for processing commodity information according to any one of the embodiments.

According to embodiments of the disclosure, there is provided a non-transitory computer-readable storage medium storing computer instructions. The computer instructions are configured to make a computer execute the method for processing commodity information according to any one of the embodiments.

According to embodiments of the disclosure, there is provided a computer program product including a computer program. When the computer program is executed by a processor, the method for processing commodity information according to any one of the embodiments is implemented.

Figure 9:
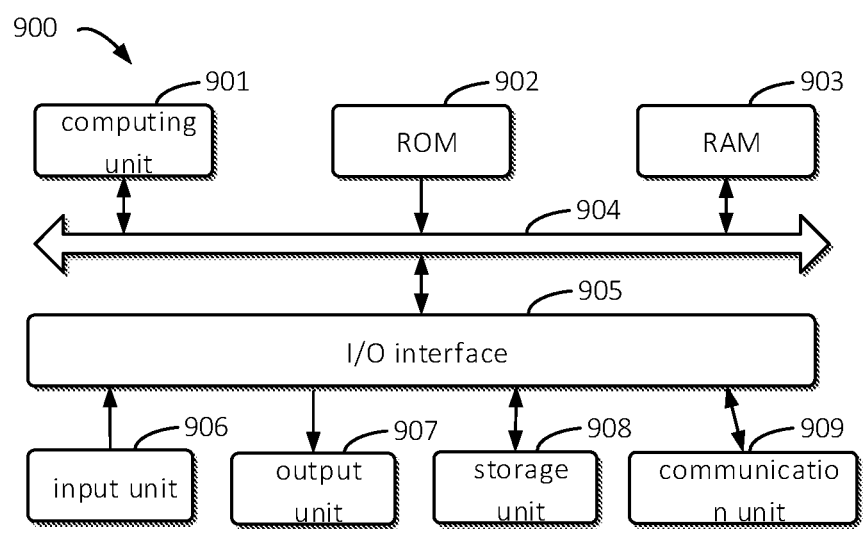
FIG. 9 is a block diagram illustrating an electronic device used to implement the method for processing commodity information according to the embodiment of the disclosure.

FIG. 9 is a block diagram of an example electronic device 900 used to implement the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 9, the device 900 includes a computing unit 901 performing various appropriate actions and processes based on computer programs stored in a read-only memory (ROM) 902 or computer programs loaded from the storage unit 908 to a random access memory (RAM) 903. In the RAM 903, various programs and data required for the operation of the device 900 are stored. The computing unit 901, the ROM 902, and the RAM 903 are connected to each other through a bus 904. An input/output (I/O) interface 905 is also connected to the bus 904.

Components in the device 900 are connected to the I/O interface 905, including: an inputting unit 906, such as a keyboard, a mouse; an outputting unit 907, such as various types of displays, speakers; a storage unit 908, such as a disk, an optical disk; and a communication unit 909, such as network cards, modems, and wireless communication transceivers. The communication unit 909 allows the device 900 to exchange information/data with other devices through a computer network such as the Internet and/or various telecommunication networks.

The computing unit 901 may be various general-purpose and/or dedicated processing components with processing and computing capabilities. Some examples of computing unit 901 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 901 executes the various methods and processes described above, such as the method for processing commodity information. For example, in some embodiments, the method may be implemented as a computer software program, which is tangibly contained in a machine-readable medium, such as the storage unit 908. In some embodiments, part or all of the computer program may be loaded and/or installed on the device 900 via the ROM 902 and/or the communication unit 909. When the computer program is loaded on the RAM 903 and executed by the computing unit 901, one or more steps of the method described above may be executed. Alternatively, in other embodiments, the computing unit 901 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server can be a cloud server, a server of a distributed system, or a server combined with a block-chain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for processing commodity information, comprising:
    obtaining commodity information of a commodity, wherein the commodity information comprises a target commodity configuration and a configuration value;
    dynamically generating and storing in a data storage system, by a processor, a composite structure of matching conditions associated with the commodity based on obtained matching conditions, the composite structure is a tree structure of matching conditions with respect to commodity configurations, non-leaf nodes of the tree structure are in an AND-OR relationship, leaf nodes of the tree structure store Boolean expressions, and each Boolean expression comprises a commodity configuration, a matching value and a matching operator;
    obtaining, from the data storage system, the composite structure;
    obtaining a target expression having an AND-OR relationship by traversing the matching conditions in the composite structure; and
    obtaining a matching result by performing a matching process based on the target expression, the target commodity configuration and the configuration value of the commodity;
    wherein generating the composite structure of matching conditions comprises:
        obtaining matching condition records based on an identifier of a matching condition container;
        de-serializing the matching condition records into a matching condition list;
        in response to an expression type of a matching condition record being a string type, interpreting the matching condition list item as a matching condition containing one sub-matching condition; and
        in response to the expression type of the matching condition record not being the string type, interpreting the matching condition item as a sub-matching condition containing one or two expressions.

2. The method of claim 1, further comprising:
    establishing a cache for caching the composite structure.

3. The method of claim 1, further comprising:
    obtaining commodity configurations, such that matching conditions associated with the commodities are set based on the commodity configurations; and
    receiving and storing set matching conditions associated with the commodities.

4. The method of claim 1, wherein obtaining the target expression comprises:
    obtaining the target expression having the AND-OR relationship by traversing the matching conditions of the composite structure by a matching condition parsing engine.

5. The method of claim 1, wherein the AND-OR relationship is related to a depth of each non-leaf node.

6. The method of claim 5, wherein the composite structure comprises at least one matching condition, each matching condition is set with respect to each commodity configuration of the commodity, and the at least one matching condition is in an AND relationship; each matching condition comprises at least one sub-matching condition, each sub-matching condition is a range of the configuration value of the commodity configuration, and the at least one sub-matching condition is in an OR relationship; each sub-matching condition comprises at least one expression, and the at least one expression is in an AND relationship.

7. An electronic device, comprising:
    at least one processor; and
    a memory communicatively coupled to the at least one processor;
    wherein, the memory stores instructions executable by the at least one processor, when the instructions are executed by the at least one processor, the at least one processor is configured to:
    obtain commodity information of a commodity, wherein the commodity information comprises a target commodity configuration and a configuration value;
    dynamically generate and store in a data storage system, a composite structure of matching conditions associated with the commodity based on obtained matching conditions, the composite structure is a tree structure of matching conditions with respect to commodity configurations, non-leaf nodes of the tree structure are in an AND-OR relationship, leaf nodes of the tree structure store Boolean expressions, and each Boolean expression comprises a commodity configuration, a matching value and a matching operator;
    obtaining, from the data storage system, the composite structure;
    obtain a target expression having an AND-OR relationship by traversing the matching conditions in the composite structure; and
    obtain a matching result by performing a matching process based on the target expression, the target commodity configuration and the configuration value of the commodity;
    wherein in generating the composite structure of matching conditions, the processor is further configured to:

obtain matching condition records based on an identifier of a matching condition container;
de-serialize the matching condition records into a matching condition list;
in response to an expression type of a matching condition record being a string type, interpret the matching condition list item as a matching condition containing one sub-matching condition; and
in response to the expression type of the matching condition record not being the string type, interpret the matching condition item as a sub-matching condition containing one or two expressions.

8. The electronic device of claim 7, wherein the at least one processor is further configured to:
establish a cache for caching the composite structure.

9. The electronic device of claim 7, wherein the at least one processor is further configured to:
obtain commodity configurations, such that matching conditions associated with the commodities are set based on the commodity configurations; and
receive and store set matching conditions associated with the commodities.

10. The electronic device of claim 7, wherein the at least one processor is configured to:
obtain the target expression having the AND-OR relationship by traversing the matching conditions of the composite structure by a matching condition parsing engine.

11. The electronic device of claim 7, wherein the AND-OR relationship is related to a depth of each non-leaf node.

12. The electronic device of claim 11, wherein the composite structure comprises at least one matching condition, each matching condition is set with respect to each commodity configuration of the commodity, and the at least one matching condition is in an AND relationship; each matching condition comprises at least one sub-matching condition, each sub-matching condition is a range of the configuration value of the commodity configuration, and the at least one sub-matching condition is in an OR relationship; each sub-matching condition comprises at least one expression, and the at least one expression is in an AND relationship.

13. A non-transitory computer readable storage medium storing computer instructions, wherein the computer instructions are configured to cause a computer to implement a method including:
obtaining commodity information of a commodity, wherein the commodity information comprises a target commodity configuration and a configuration value;
dynamically generating and storing in a data storage system by a processor of the computer, a composite structure of matching conditions associated with the commodity based on obtained matching conditions, the composite structure is a tree structure of matching conditions with respect to commodity configurations, non-leaf nodes of the tree structure are in an AND-OR relationship, leaf nodes of the tree structure store Boolean expressions, and each Boolean expression comprises a commodity configuration, a matching value and a matching operator;
obtaining, from the data storage system, the composite structure;
obtaining a target expression having an AND-OR relationship by traversing the matching conditions in the composite structure; and
obtaining a matching result by performing a matching process based on the target expression, the target commodity configuration and the configuration value of the commodity;
wherein generating the composite structure of matching conditions comprises:
obtaining matching condition records based on an identifier of a matching condition container;
de-serializing the matching condition records into a matching condition list;
in response to an expression type of a matching condition record being a string type, interpreting the matching condition list item as a matching condition containing one sub-matching condition; and
in response to the expression type of the matching condition record not being the string type, interpreting the matching condition item as a sub-matching condition containing one or two expressions.

14. The non-transitory computer readable storage medium of claim 13, wherein the method further comprises:
establishing a cache for caching the composite structure.

15. The non-transitory computer readable storage medium of claim 13, wherein the method further comprises:
obtaining commodity configurations, such that matching conditions associated with the commodities are set based on the commodity configurations; and
receiving and storing set matching conditions associated with the commodities.

16. The non-transitory computer readable storage medium of claim 13, wherein obtaining the target expression comprises:
obtaining the target expression having the AND-OR relationship by traversing the matching conditions of the composite structure by a matching condition parsing engine.

17. The non-transitory computer readable storage medium of claim 13, wherein the AND-OR relationship is related to a depth of each non-leaf node.

* * * * *